(12) United States Patent
Bass

(10) Patent No.: US 6,365,111 B1
(45) Date of Patent: Apr. 2, 2002

(54) HOLDER FOR SPECIMEN EXAMINATION

(75) Inventor: Leland L. Bass, Pomona, CA (US)

(73) Assignee: Randall C. Bass, LaVerne, CA (US)

( * ) Notice: Subject to any disclaimer, the term of this patent is extended or adjusted under 35 U.S.C. 154(b) by 0 days.

(21) Appl. No.: 09/545,656

(22) Filed: Apr. 10, 2000

Related U.S. Application Data

(60) Provisional application No. 60/150,709, filed on Aug. 25, 1999.

(51) Int. Cl.[7] .................................................. B01L 3/00

(52) U.S. Cl. .................... 422/102; 422/99; 422/104; 206/5.1

(58) Field of Search .................... 422/99, 102, 104; 435/299, 301, 310; 206/5, 5.1, 6

(56) References Cited

U.S. PATENT DOCUMENTS

| | | | | |
|---|---|---|---|---|
| 3,768,633 A | * | 10/1973 | Nathan | 206/5 |
| 4,328,890 A | * | 5/1982 | Thomas et al. | 206/5.1 |
| 4,865,186 A | * | 9/1989 | Gates | 206/5 |
| 5,615,765 A | * | 4/1997 | Roericht | 206/45.23 |
| 5,657,506 A | * | 8/1997 | Pankow | 15/104.92 |
| 6,092,646 A | * | 7/2000 | Glazier | 206/5.1 |

* cited by examiner

*Primary Examiner*—Jill Warden
*Assistant Examiner*—Dwayne K. Handy
(74) *Attorney, Agent, or Firm*—Boniard I. Brown

(57) ABSTRACT

A specimen holder for examination of specimens has first and second members for sealing engagement to define a specimen chamber of predetermined thickness and evenly spread. A chamber is defined between the first and second members for excess liquid expressed upon the sealing engagement of said members.

9 Claims, 2 Drawing Sheets

HOLDER FOR SPECIMEN EXAMINATION

This application claims benefit of Prov. No. 60/150,709 filed Aug. 25, 1999.

BACKGROUND AND SUMMARY OF THE INVENTION

It has long been the customary practice to prepare liquid specimens for microscopic examination by placing a small quantity of specimen on a flat, transparent slide, disposing a small quantity of specimen thereon, as by manual operation of a dropper, then cover the specimen with a thin, transparent cover slip to spread a specimen into a thin film. Reliance is placed on capillary action to retain liquid specimen between the plate and the cover slip, the slide thus prepared and microscopically examined. Such examination often or typically for the purpose of analysis of particulate matter in the liquid, and examination of particulate matter in urine, blood, spinal fluid, sputum, cell cultures, etc. The objective is to spread a specimen to a generally uniform thickness with solid particles therein spaced uniformly on the slide plate.

The volume of specimen will of course vary with the size of the drop or drops applied to a slide, and the force applied between the cover slip and the plate. Distribution of solid particles in the liquid specimen have been typically effected by manual squeezing action, and the thickness of a specimen is dependent upon the quantity of sample disposed on the slide, etc., and can result inerrors of 50% to 200%. Thus, various factors will affect examination results. Dependence is placed upon the skill and experience of a technician. Significant dexterity, manipulation and skill are required to provide a good specimen properly disposed with a cover slip thereon, for proper handling of the slide from the beginning through examination. The process requires substantial expenditure of time by the technician.

The present invention provides a specimen of accurate size, evenly spread for examination, which is quickly provided by disposing a drop of specimen onto a first member, then snapping a second member into engagement with the first member to contain and define a discrete specimen with its thickness determined by a raised ring of accurate dimension extending from the first member and sealingly engaging the second member. Excess specimen liquid is automatically expressed from the specimen chamber thus defined into a reservoir defined between the first and second members. A transparent window is defined in one member to view evenly distributed particulate matter in the specimen.

DESCRIPTION OF THE PREFERRED EMBODIMENT

Figure 1:
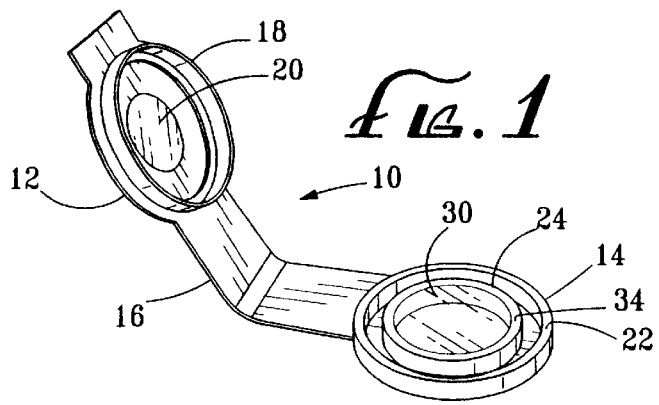
FIG. 1 is a perspective view of a holder according to the invention in open configuration.
Figure 2:
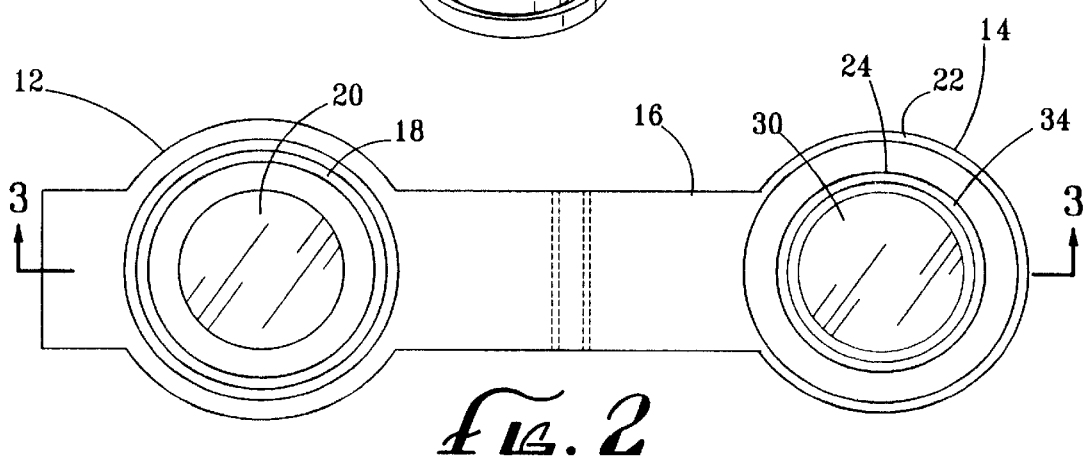
FIG. 2 is a plan view of the specimen holder of FIG. 1.
Figure 3:
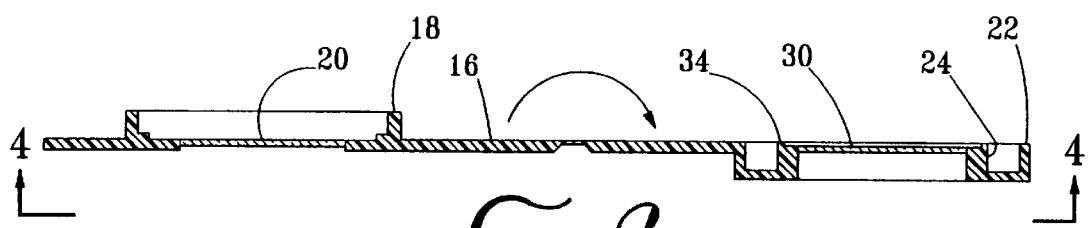
FIG. 3 is a sectional view taken at line 3—3 in FIG. 2.
Figure 4:
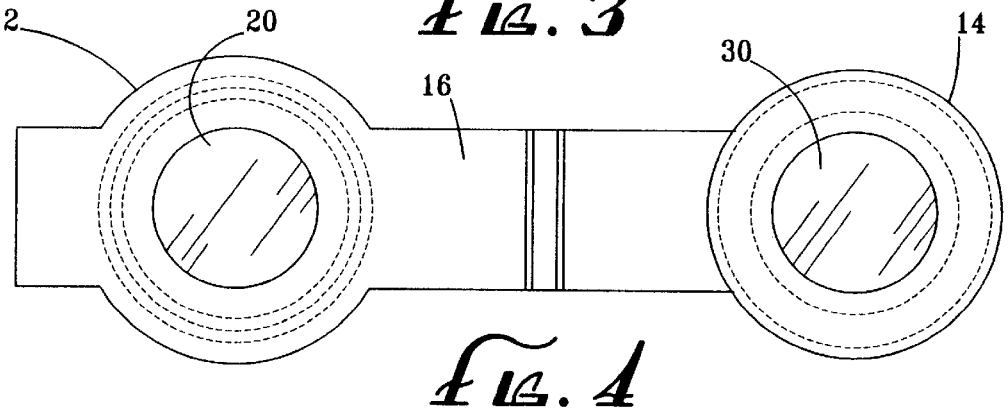
FIG. 4 is a view taken at line 4—4 in FIG. 3.
Figure 5:
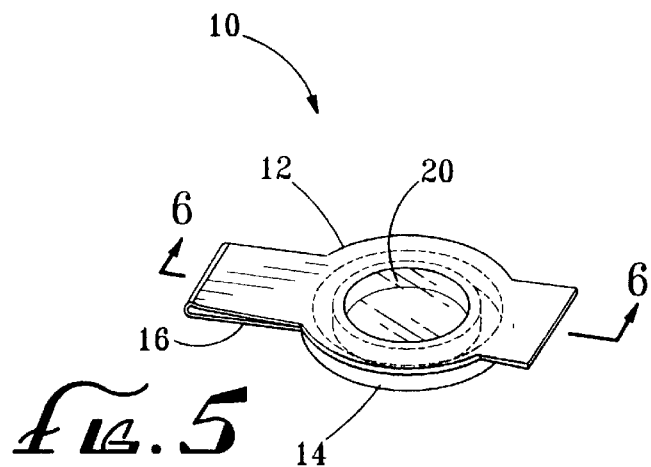
FIG. 5 is a perspective view of a holder of FIGS. 1–4 in a closed configuration.

The present invention provides a holder for microscopic examination of specimens, such as liquid urine having particles therein.

Referring to the drawings, a holder 10 comprises an upper member 12 and a lower member 14 which are joined by a flexible strap 16.

Upper member 12 has an annular wall 18 disposed about a transparent window 20. The lower member 14 has an outer wall portion or flange 22 and an inner wall or flange 24 spaced from wall 22 to define a channel disposed about a transparent window 30.

Upper and lower members 12, 14 are configurated and adapted to be snap-fitted together with annular wall 18 of member 12 disposed within and against outer wall 22 of member 14, and spaced from inner wall 24, thus to define a reservoir 32 to receive and retain excess liquid squeezed from the space between the transparent portions 20, 30 of the two members when they are snapped or forced together. When the two members are snapped or urged closed together, liquid specimen flows typically in all directions, with any excess squeezed from the specimen chamber hereinafter described, passing into reservoir 32.

Figure 6:
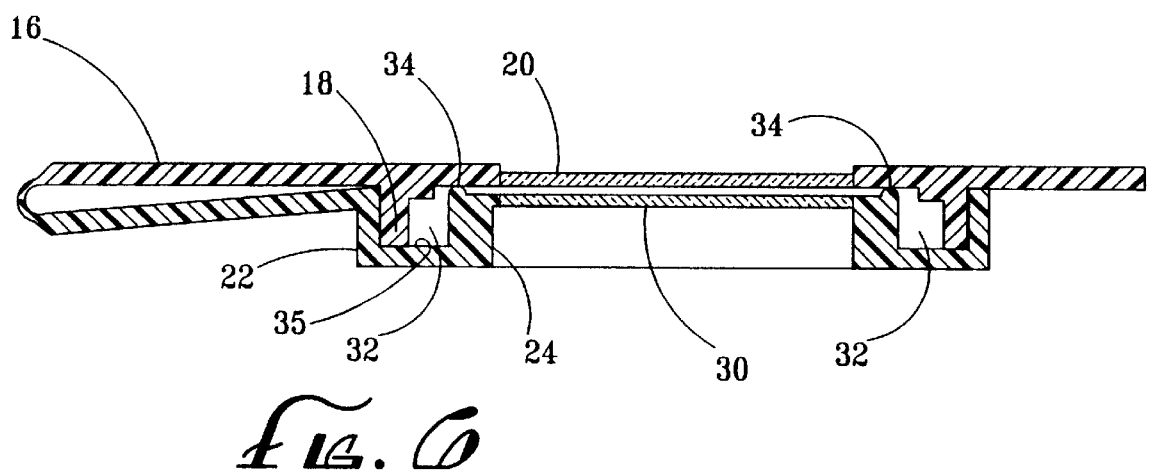
FIG. 6 is a sectional view taken at line 6—6 in FIG. 5.

Referring to FIG. 6, the space or specimen chamber between the members 12, 14 is determined by an annular bead or knub 34 which extends above the inner wall 24 of member 14, and is preferably 0.004". When the two members 12, 14 are urged or snapped together, they are firmly guided and positioned, thus to prevent any bulging or arching of the windows 20, 30. The bulging or arching of the transparent windows can create a magnifying glass effect which would distort the viewing of the specimen between the windows, and adversely affect the accuracy of microscopic examination. Positive support and stability of the windows is provided and the spacing therebetween is accurately preserved.

The holder members may preferably be formed of transparent, plastic material, typically polypropylene for clear viewing therethrough of specimens under a microscope, as for counting white or red blood cells, contaminants, and other particles. With the halves 12, 14 in effect smashed together, with the transparent windows spaced accurately apart with predetermined spacing, a specimen is uniform throughout the viewing area. Particle sizes may be as large as about the size of the dimension between the windows, or even larger.

The specimen sample is provided in a closed, sealed system. Particles larger than a dimension between the two transparent windows are smashed to smaller dimension automatically. A uniform, evenly distributed specimen is provided over the area of observation.

It will be understood that various changes and modifications may be made from the preferred embodiments discussed above without departing from the scope of the present invention, which is established by the following claims and equivalents thereof.

What is claimed is:

1. A holder for specimens for microscopic examination, comprising:

first and second members sealingly engageable together to define a specimen chamber, said first member having outer and inner walls defining a continuous channel, said second member having a continuous wall sealingly engageable with said first member outer wall, a bead on said first member inner wall to engage the other member when the first and second members are sealingly engaged to define a specimen chamber having a depth determined by the height of said bead, whereby a specimen is evenly spread in said specimen chamber for viewing, and at least one of said first and second members comprising a viewing window at said specimen chamber.

2. A holder according to claim 1, wherein each of the first and second members have viewing windows defined therein.

3. A holder according to claim 1, wherein said first and second members are joined by a flexible strap foldable for engagement together of said first and second members.

4. A holder according to claim 1, wherein said first member outer and inner walls and said second member wall are of annular configuration.

5. A holder according to claim 1, wherein upon the engagement of said first and second members, a closed reservoir is defined between said inner wall of the first member and said second member wall, the reservoir receiving any excess specimen expelled from between the first and second members when urged together.

6. A holder for specimens for microscopic examination, comprising:

first and second members sealingly engageable together to define a specimen chamber, said first member having outer and inner annular walls defining a continuous channel, said second member having annular wall sealingly engageable with said first member outer wall, a bead on said first member inner wall and having a height of a few thousandths of an inch to engage the second member when the first and second members are sealingly engaged, whereby a specimen chamber is defined having a depth determined by the height of said bead to evenly spread a specimen for viewing in the specimen chamber, and at least one of said first and second members comprises a viewing window at said specimen chamber.

7. A holder according to claim 6, wherein said first and second members are joined by a flexible strap foldable for engagement together of said first and second members.

8. A holder according to claim 6, wherein each of the first and second members have viewing windows defined therein.

9. A holder according to claim 6, wherein upon the engagement of said first and second members, a closed reservoir is defined between said inner wall of the first member and said second member wall, the reservoir receiving any excess specimen expelled from between the first and second members when urged together.

\* \* \* \* \*